Oct. 13, 1959 B. P. BOGERT 2,908,873

AUTOMATIC PHASE EQUALIZER

Filed Aug. 5, 1957

INVENTOR
B. P. BOGERT
BY H. O. Wright
ATTORNEY

United States Patent Office 2,908,873
Patented Oct. 13, 1959

2,908,873

AUTOMATIC PHASE EQUALIZER

Bruce P. Bogert, Morristown, N.J., assignor to Bell Telephone Laboratories, Incorporated, New York, N.Y., a corporation of New York Application August 5, 1957, Serial No. 676,280
9 Claims. (Cl. 333—18)

This invention relates to electrical circuit networks for and methods of effecting a correction of distortion imposed upon communication signals in passage through a transmission medium.

A great many networks are known to those skilled in the art for correcting signal distortions. Functionally these networks may be divided into two broad classes. The one is directed toward the correction of amplitude distortions or distortions occasioned by the unequal amplitude response of a transmission medium to different frequency components of signals applied thereto. The other network functional type operates to correct phase distortions or distortions arising from the velocity dispersive effect of a transmission medium upon different frequency components of signals transmitted therethrough.

Structurally, too, distortion correcting networks may be conveniently separated into two categories. The first of these is the passive network in which inductors, capacitors and resistors are arranged for attenuating and accentuating received signals in complementary relation to the attenuation and accentuation imposed by a distorting transmission medium. The second of these structural groups may be categorized as the active networks in which complementary correcting signals are applied to the distorted signal to be corrected.

The structures of the prior art have been most successful in achieving their particular purposes. They are, however, open to the objection of inflexibility. That is to say, structures of the prior art are structurally fixed or at best provide for only minor adjustment for the correction of the distortion imposed by a particular transmission medium under a particular set of environmental conditions such as temperature and humidity.

It is accordingly an object of the present invention to correct signal distortion imposed by any one of a broad group of transmission lines and to accomplish this correction quickly, exactly and automatically for any particular transmission line under the varying environments to which this line may be subjected.

It is a further object of the invention to achieve this correction with a minimum of apparatus complexity and with precision and dispatch.

These and other objects of the invention are achieved with a structure based on the dual recognition that amplitude distortions, that is, distortions occasioned by variable attenuation of the different frequency components of a signal, may be readily correctible by conventional passive structures which are relatively constant in correction capabilities despite environmental variations and that phase distortion, a highly variable error with changing temperature, humidity and the like, may be separately corrected by an active structure.

The invention turns these recognitions to account by first providing a transmission medium corrected for amplitude distortion and, second, by providing means for storing time spaced samples of the phase distorted response of that line to a standard pulse signal and, thereafter, applying these so stored response signal samples in multiplying relation with subsequently received communication signals which have been phase distorted in their transmission over the amplitude equalized medium. In further practice of the invention, the resulting product signals are combined in a common output circuit to produce an undistorted replica of the communication signal as originally applied to the transmission medium. Thus, following the principles of the invention, a new phase distortion correcting device may be effectively manufactured instantaneously to meet variations in operating conditions.

It is well known in accordance with the Nyquist sampling theorem that any signal of a frequency content extending between limits ±W, where W is the highest frequency used, may be represented by instantaneous samples of that signal taken at intervals T, given by the expression $$T=\frac{1}{2W} \qquad (1)$$

If any such instantaneous sample, i.e., pulse signal, be applied to an amplitude-equalized transmission medium having a velocity dispersive effect upon different frequency components of that signal, the so applied pulse does not appear at the output end of the transmission line as an instantaneous signal. Rather, it appears as a signal having a finite duration. This results from two effects. First, any physically realizable transmission medium is limited in its frequency bandwidth for signal transmission. Hence, any signal transmitted over a practical transmission line has a finite rise and fall time. More important to this present consideration, the instantaneous signal sample becomes elongated in transmission through a medium by virtue of the fact that different frequency components of the signal are propagated at different velocities through the medium. Whence these different frequency components of an instantaneous sample signal arrive at the output end of a transmission medium at different times and the instantaneous pulse sample signal is elongated. This is phase distortion in its simplest form.

For a more normal communication signal applied to such an amplitude equalized transmission medium, it is convenient to consider the phase distortion imposed upon that signal by the medium as being the sum of the phase distortions imposed upon successive ones of the Nyquist samples which may, with exactness and precision, represent that signal.

Thus, each successive Nyquist sample of a communication signal may be considered for simplicity as being multiplied by a function of time, $f(t)$, by operation of the phase distorting transmission medium. Viewing a representative communication signal in the time domain and adopting the above convenient artificiality, $f(t)$, for describing the phase distortion elongation of each Nyquist signal sample, it appears that this distortion may be eliminated by multiplying each distorted sample signal with a reverse function of time, that is, a function of negative time, $f(-t)$.

In accordance with the invention there is provided a structure for simply and automatically deriving from an amplitude equalized transmission medium, a signal representative of just such a reverse time multiplying factor and for quickly and automatically applying that signal for correcting phase distortion imposed upon a communication signal by the transmission medium.

The invention will be more clearly understood and other objects, features and advantages thereof will become apparent during the course of the following detailed description of an illustrative embodiment of the principles of the invention and from the appended claims.

Figures 1, 2:
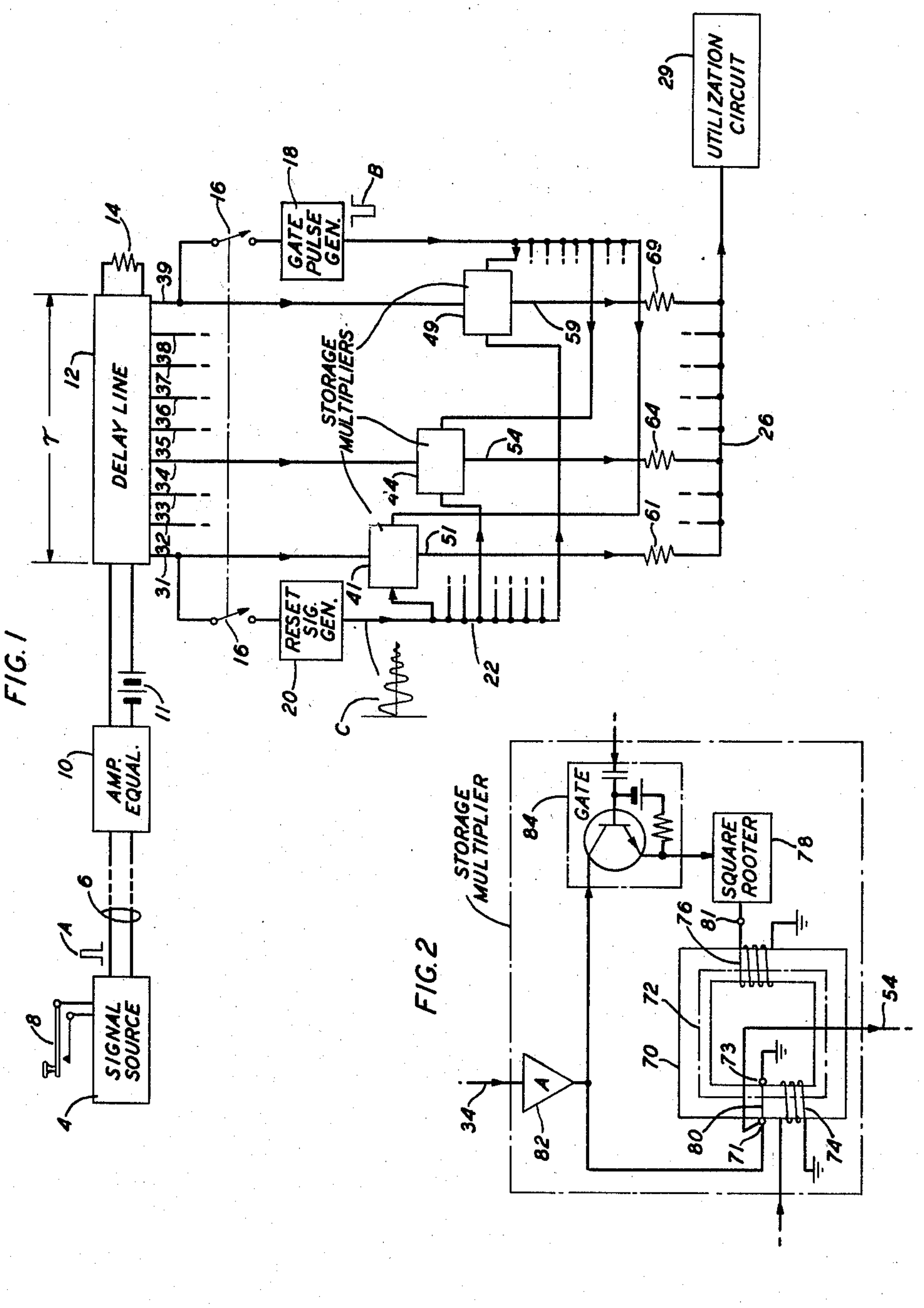
Fig. 1 is a partial schematic representation of an illustrative embodiment which comprises a communication system corrected for phase distortion in accordance with the principles of the invention.
Fig. 2 is a more detailed diagrammatic representation of component apparatus which may conveniently be employed in the practice of the invention in the system shown in Fig. 1.

Referring now more particularly to the drawings, Fig. 1 shows a communication signal source 4 connected to the input end of a transmission medium 6 having an upper frequency limit W for transmission of signal frequencies. The signal source is provided with a key 8 for applying a test pulse signal of sharp waveform, for example, as illustrated by the waveform A, to the transmission medium. This pulse signal has a duration small compared with the interval T where T is given by the expression $$T=\frac{1}{2W} \qquad (1)$$

Hence, as is well known in the art, this pulse signal has a uniform amplitude among all its signal components of different frequencies from zero up to and including the limiting frequency W. The transmission medium 6 includes an amplitude equalizer 10 which may conveniently be one such as described in H. W. Bode Patent No. 1,955,788, granted April 24, 1934.

At the output, or receiving, end of the transmission medium 6 there is connected the input end of a plurally tapped delay line 12 constructed in accordance with familiar principles and having a uniform delay for all signal frequencies lying within the passband of the transmission medium 6. This line is constructed to have a total delay at least as great as the dispersion imposed by the transmission medium 6 upon significant frequency components of signals lying within the transmission passband of that medium. A biasing battery 11 is connected in circuit with the transmission medium 6 and the delay line 12 to ensure a convenient positive polarity for all signals impressed upon the delay line. Connected to the delay line at its output end is a terminating resistor 14 chosen, as is well known, of a value equal to the characteristic impedance of the line 12, thus to prevent reflections of signals traveling along the delay line.

At the output end of the delay line a connection also is made from the final tap 39 of several lateral taps through one conduction path of a double pole, single throw switch 16 to a gate pulse generator 18 which may conveniently be a blocking oscillator such as shown by J. Millman and H. Taub in "Pulse and Digital Circuits," McGraw-Hill Book Company, Inc., New York, 1956, at page 283. Thus, with the switch 16 in the closed position, a signal arriving at the end of the delay line acts to trigger the gate pulse generator 18. This generator, in turn, delivers an output pulse which, for example, may be one having the waveform shown at B. Similarly, at the input end of the delay line a connection is made from the first tap 31 of several lateral taps through the other conduction path of the double pole switch 16 to a reset signal generator 20 which may be a blocking oscillator similar to the gate pulse generator 18 connected in tandem with a tuned resonant circuit having a damping resistor. As is well known in the art, such a blocking oscillator so connected when triggered acts to shock excite the tuned circuit. Thus this reset signal generator derives a damped sinusoidal signal as shown at C for application to a reset line 22.

Lateral output taps 31 through 39 inclusive, are connected at equal intervals along the delay line 12 corresponding to time intervals T as defined heretofore in Expression 1. Plural storage multipliers 41 through 49 inclusive, only three of which multipliers 41, 44, and 49 are indicated illustratively, are respectively connected in tandem with each of these taps. Each of the storage multipliers is also connected, as shown, to receive an input signal from the reset line 22 and from the gate signal generator 18. These storage multipliers are devices for storing one input signal as a factor and for thereafter applying that factor in multiplying relation to subsequently received signals to derive a product signal. A representative one of these storage multipliers is discussed in more detail below in connection with Fig. 2.

From each of the storage multipliers associated with the plural lateral taps plural output leads 51 through 59 inclusive connect respectively through plural isolating resistors 61 through 69 inclusive to a common output line 26. Of these output leads and isolating resistors only the illustrative leads 51, 54 and 59 and the illustrative resistors 61, 64, 69 are shown. From the output line 26, connection is made to a utilization circuit 29 which may be, for example, any of the receivers well known in the prior art for association with the signal source 4.

Important elements of the structure shown in Fig. 1 are the storage multipliers 41 through 49, inclusive. In this illustrative embodiment these storage multipliers conveniently may comprise a Memistor, a multiplying circuit element which has been devised by applicant and an associate, F. P. Burns, together with associated circuitry for adaptation to the functions of the structure shown in Fig. 1. Such a storage multiplier is shown in some schematic detail in Fig. 2, where, for clarity, numerical designators corresponding to a particular illustrative storage multiplier 44 have been employed.

In this Fig. 2 there is shown a substantially closed magnetic core 70 constructed of high remanence magnetic material and having a small magnetic gap transverse to a central magnetic axis 72 of the core structure. On the core there are provided two windings, a reset winding 74 and a signal storage winding 76. Serially connected with the signal storage winding is a square root extracting device 78 commonly called a "square rooter" which may be of the type shown in "Waveforms," first edition, volume 19, of the Radiation Laboratories Series, published by the McGraw-Hill Book Company, Inc., in 1949, at page 686. The reset winding 74 is adapted for connection in circuit with the reset line 22, shown in Fig. 1.

A thin plate 80 of semiconductive material having high charge carrier mobility, for example, indium antimonide, is placed in the magnetic gap of the core 70. Serially connected with this plate 80 is an amplifier 82 for deriving a current signal proportional to an input voltage signal. Such an amplifier, as is well-known in the art, may be of the conventional type employing a pentode vacuum tube. The input voltage signal is applied to the amplifier through the associated input connection 34. The current output signal from the amplifier is delivered in common both to the indium antimonide plate at a first input terminal 71 for passage through the plate to an oppositely placed terminal 73 and to a normally open or non-conducting coincidence gate 84, illustratively, a gate such as the simple transistor switch shown diagrammatically. Thence, with the gate 84 in the closed or conducting condition the current signal passes through the square rooter 78 to a second multiplier input terminal 81 and to the signal storage winding 76.

As is well known in the art, a magnetic field impressed upon a body of high charge carrier mobility acts to increase the electrical resistivity of that body to a current flowing transversely to that magnetic field. That is to say, such a body is magnetoresistive. The relationship between the impressed magnetic field and the electrical resistivity of the body being quadratic, the function of the square rooter becomes apparent.

Currents flowing from the amplifier 82 are proportional to the voltage impressed on the amplifier. Extracting the square root of such a current in the square rooter 78 and applying that square root current to the winding 76, a magnetic field proportional to the square root current is generated in the core structure. The resistivity of the plate 80 is varied as the square of the impressed magnetic flux. Hence, by virtue of the operation of the square rooter, it follows that the resistivity of the plate 80 varies directly with the voltage applied to the amplifier 82. Consequently the voltage appearing across the plate, as at the output lead 54 is proportional to the product of the voltage signal stored in the magnetic core and that applied directly to the amplifier for further application as a current signal to the magnetoresistive plate 80.

Returning now to the consideration of Fig. 1, the operation of the system there shown becomes apparent. The double pole switch 16 being in the closed position, a short pulse of the rectangular waveform A is applied to the input end of the transmission medium 6 by the operation of the key 8 in conjunction with the signal source 4. The first significant portion of this signal arriving at the input end of the delay line 12 actuates the reset signal generator 20 to generate a damped sinusoidal signal C for application to the reset lead 22 thence to the reset windings of the plural storage multipliers 41 through 49, inclusive. This damped sinusoidal signal C acts to magnetically cycle the magnetic core of each of the multipliers and thus to remove any magnetic signal stored therein.

The decrement of the sinusoidal signal C is adjusted so that the signal will expire within the time $\tau$ corresponding to the total delay of the line 12. Whence, as the first portion of the distorted signal arrives at the output end of the delay line, each of the storage multiplier cores will have already been demagnetized. At this instant the first signal portion activates the pulse generator 18. Since the total delay $\tau$ of the line has been chosen to be no less than the velocity dispersion of the medium 6 for substantially all frequency components transmissible by the medium, the total response of the transmission medium to the impulse signal of waveform A is distributed along the delay line 12 at the instant of arrival of the first significant signal component at the delay line output end.

That is to say, at this particular instant the delay line has derived a space pattern representation of the impulse time response of the transmission medium. Each one of the plural lateral taps, 31 through 39, inclusive, from right to left as shown, in turn, derives a sample of that response as it exists at successively later instants of time.

Actuation of the gate pulse generator provides a signal to each of the storage multipliers. This signal, acting on the gate of each storage multiplier, closes the circuit from an associated lateral output tap through the amplifier and gate to the square rooter thence to the storage winding of a Memistor. Hence, each one of the samples of the impulse response of the transmission medium appearing on the several lateral output taps are simultaneously applied to the associated storage winding of each individual storage multiplier, respectively. Thus, the impulse response of the transmission medium 6 is stored as a magnetic space pattern represented by the respective states of magnetization of the several magnetic cores. The phase equalizer in accordance with the invention is now conditioned to correct subsequently received communication signals.

After storage of these impulse response sample signals by thus magnetizing each of the respective cores of the several storage multipliers in accordance with the signal on its associated delay line tap, the switch 16 is thrown to the open position. For simplicity the switch 16 is indicated as a manually operated switch though it is obvious to one skilled in the art that such a switch can readily be arranged for automatic operation by the employment of electromagnetic relays and the like.

Communication signals from the source 4 are phase distorted in passage through the medium 6 and upon arrival at the delay line 12, are successively applied through the several output taps, from left to right as shown, to the successive storage multipliers. The impulse sample signals stored from right to left may be considered as samples of the function of time, $f(t)$ by which the transmission medium has multiplied the test impulse signal of waveform A. Taken from left to right these samples may be considered samples of this same function but of negative time, i.e., $f(-t)$. Arriving communication signals passing through successive taps to magnetoresistive plates of the several storage multipliers are multiplied by these stored samples from left to right. That is, the stored sample signals are applied to the arrival communication signal in inverse order. Whence the time function distorting factor, $f(t)$ applied to each element of the communication signal by the transmission medium is counteracted by a reversed time function factor, $f(-t)$, as each of these elements is successively multiplied by inverted order stored sample signals. The resulting product signals are passed through the several product output leads 51 through 59 inclusive, only, illustrative leads 51, 54 and 59, being shown. From here these signals respectively pass through isolating resistors 61 through 69 inclusive, only illustrative resistors 61, 64 and 69, being shown, to the common output line 26.

In this common output line the several product signals derived in the plural storage multipliers are combined and the resulting combined signal is delivered to a conventional utilization circuit 29 as a faithful reproduction of the signal delivered to the medium 6 by the source 4 with all phase distortion eliminated.

The invention is, of course, not limited to the structure of the specific illustrative embodiment described. It will be readily apparent to those skilled in the art that other instrumentations of the invention may be employed. Thus, for example, the delay line of the illustrative embodiment described might well be replaced by other suitable delay means, for example, a rotating switch having its contacts properly spaced for deriving samples from a conventional storage medium such as a magnetic tape. Whence, successive samples of the impulse response of the line might be applied in properly time-spaced relationship with arriving communication signal samples in many different types of multipliers well known in the art. Many such modifications of the invention will immediately occur to those skilled in the art and are embraced within the scope and spirit of the invention.

Reference is hereby made to a copending application of J. R. Pierce, Serial No. 676,776, filed August 7, 1957. The said Pierce application is assigned to applicant's assignee. It discloses and claims subject matter functionally related to that of the present application.

What is claimed is:

1. Apparatus for correcting phase distortion imposed upon a communication signal of multiple frequency content in passage from a signal source to a receiver through an amplitude equalized transmission medium having a velocity dispersive effect upon the different frequency components of signals applied thereto which comprises means for storing consecutive time-spaced samples of the response of said medium to a test signal of uniform frequency content throughout the transmission band of said medium, means for applying said time-spaced samples in reverse order as multiplying factors for communication signals passed through said transmission medium, thereby to derive a plurality of product signals, each continuous in correspondence to the arrival of said communication signals and each proportional to a different one of said stored samples, and output means for applying said plurality of product signals in common to said receiver.

2. Apparatus as set forth in claim 1 wherein said storing means comprises means for deriving from the response of said transmission medium to a signal of uniform frequency content throughout the transmission band of said medium consecutive samples spaced apart in time by an interval not greater than one-half the period of the highest frequency transmitted by said medium.

3. Apparatus as set forth in claim 1 wherein said storing means comprises a delay line having an input end connected to said transmission medium and an output end, plural lateral output taps spaced along said delay line and means responsive to signals appearing at said delay line output end for deriving signal samples from said lateral output taps.

4. Apparatus for correcting phase distortion imposed upon a communication signal of multiple frequency content in passage from a signal source to a receiver through an amplitude equalized transmission medium having a velocity dispersive effect upon the different frequency components of signals applied thereto which comprises means for applying to said transmission medium a test impulse signal having a uniform frequency content throughout the transmission band of said medium, means for deriving plural time-spaced samples of said test signal upon passage through said medium, means for applying said plural samples in inverse time-spaced order as multiplying factors to said communication signal upon passage through said medium, thereby to derive a like plurality of product signals, and means for applying said product signals in common to said receiver.

5. Apparatus as set forth in claim 4 wherein said sample deriving means comprises a delay line having an input end connected to said transmission medium and an output end, a plurality of lateral output taps spaced along said delay line, a like plurality of storage means connected in circuit with said output taps, respectively, and signal responsive means connected in circuit with said delay line output end and said output taps for applying signal samples from said output taps to said storage means.

6. Apparatus as set forth in claim 5 and in combination therewith signal operated means connected in circuit between said delay line input end and said storage means for erasing signals stored in said storage means.

7. Apparatus as set forth in claim 4 wherein said plural sample applying means comprises a like plurality of signal multiplying means each having a first input terminal and a second input terminal connected in circuit with one of said output taps, and storage means connected in circuit with said second input terminal, and plural signal operated means connected in circuit with each of said second input terminals and with each of said lateral taps for applying signal samples simultaneously to said storage means from each of said lateral taps respectively.

8. In combination with an amplitude equalized transmission medium a phase equalizer for communication signals which comprises means for storing plural time-spaced samples of the response of said transmission medium, means for applying said samples in inverted order as similarly time-spaced multiplying factors to communication signals transmitted through said medium thereby to derive a plurality of product signals, and output means for combining said product signals, whereby a signal proportional to said communication signals and with phase distortion eliminated, is derived.

9. Apparatus as set forth in claim 8 wherein said storing means comprises a like plurality of magnetic recording means.

References Cited in the file of this patent

UNITED STATES PATENTS

| | | |
|---|---|---|
| 2,446,479 | Begun | Aug. 3, 1948 |
| 2,657,276 | Eliot et al. | Oct. 27, 1953 |